United States Patent
Warrier et al.

(10) Patent No.: US 7,120,701 B2
(45) Date of Patent: Oct. 10, 2006

(54) ASSIGNING A SOURCE ADDRESS TO A DATA PACKET BASED ON THE DESTINATION OF THE DATA PACKET

(75) Inventors: Ulhas S. Warrier, Beaverton, OR (US); Saul Lewites, Hillsboro, OR (US); Prakash N. Iyer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 09/792,879

(22) Filed: Feb. 22, 2001

(65) Prior Publication Data

US 2002/0116523 A1 Aug. 22, 2002

(51) Int. Cl.
*G06F 15/16* (2006.01)

(52) U.S. Cl. ............ 709/245; 709/223; 709/236; 709/238; 709/246; 370/389; 370/390; 370/391; 370/392; 370/401; 370/474

(58) Field of Classification Search ........ 370/389–392, 370/401, 474; 709/203, 218, 236, 238, 223, 709/245, 246
See application file for complete search history.

(56) References Cited

U.S. PATENT DOCUMENTS

| | | | | |
|---|---|---|---|---|
| 5,623,601 | A * | 4/1997 | Vu | 726/12 |
| 5,884,025 | A * | 3/1999 | Baehr et al. | 713/201 |
| 6,154,839 | A * | 11/2000 | Arrow et al. | 713/154 |
| 6,324,178 | B1 * | 11/2001 | Lo et al. | 370/392 |
| 6,353,891 | B1 * | 3/2002 | Borella et al. | 726/12 |
| 6,477,164 | B1 * | 11/2002 | Vargo et al. | 370/356 |
| 6,567,405 | B1 * | 5/2003 | Borella et al. | 370/389 |
| 6,584,096 | B1 * | 6/2003 | Allan | 370/352 |
| 6,708,219 | B1 * | 3/2004 | Borella et al. | 709/245 |
| 6,781,982 | B1 * | 8/2004 | Borella et al. | 370/352 |
| 6,884,025 | B1 * | 4/2005 | Pickens et al. | 415/160 |
| 2002/0026528 | A1 * | 2/2002 | Lo | 709/245 |
| 2002/0042875 | A1 * | 4/2002 | Shukla | 713/151 |

OTHER PUBLICATIONS

Nikander, Pekka "Combining Trust Management, Jini, IPv6, and Wireless links: A Proposal for a Service Network Archictecture for Ad Hoc Environments Extended Abstract", Helsiniki University of Technology, pekka.nikander@hut.fi.
Jeffrey Lou et al., "IP Host Network Address (and Port) Translation", draft-ietf-nat-hnat-00.txt, Nov. 1998.
Y. Rekhter et al., "Address Allocation for Private Internets", Best Current Practice, Feb. 1996.
G. Montenegro et al., "RSIP Support for End-to-end IPsec", Experimental, Oct. 2001.
Michael Borella et al., "Distributed Network Address Translation", draft-borella-aatn-dnat-01.txt, Oct. 1998.

* cited by examiner

*Primary Examiner*—Saleh Najjar
*Assistant Examiner*—Shawki Ismail
(74) *Attorney, Agent, or Firm*—Fish & Richardson P.C.

(57) ABSTRACT

A method and apparatus are provided for sending a data packet through a network. The network has public and private realms separated by an interface device. A client in the private realm performs the method. The method includes determining if a destination address of the data packet corresponds to the private realm or to the public realm and retrieving a source address for the client based on the destination address of the packet. The method also includes assigning a retrieved address to be the source address of the data packet.

21 Claims, 4 Drawing Sheets

ASSIGNING A SOURCE ADDRESS TO A DATA PACKET BASED ON THE DESTINATION OF THE DATA PACKET

TECHNICAL FIELD

This invention relates to dynamically assigning a source address to a data packet based on the destination of the data packet.

BACKGROUND

A computer network may include a private realm and a public realm. The private realm contains computers sharing a private addressing scheme known only to the computers in that private realm. The public realm contains computers sharing a public addressing scheme known to all computers in the network, whether public or private. A packet may be sent between computers on the public and private realms through an interface device, such as a gateway.

DESCRIPTION OF THE DRAWINGS

Like reference symbols in the various drawings indicate like elements.

DETAILED DESCRIPTION

Figure 1:
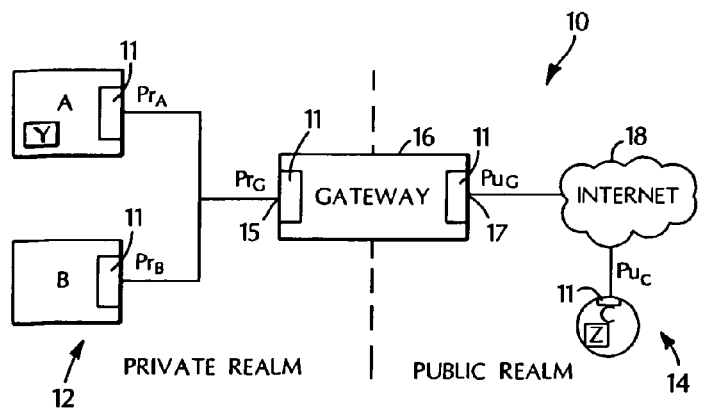
FIG. 1 is a view of a computer network having private and public addressing realms.

Network 10 (FIG. 1) includes private realm 12 and public realm 14. Private realm 12 is a private address realm. Public realm 14 is the public address realm.

Private realm 12 includes, here computers A and B (i.e. private clients) and gateway 16. Public realm 14 includes, here computer C (i.e. public client) and gateway 16 connected by Internet 18.

Private clients A and B share a private addressing scheme known only to members of private realm 12. Each private client has its own private address. Here private client A has the private IP address $Pr_A$ while private client B has the private IP address $Pr_B$. Typically, a Request for Comment 1918 ("RFC 1918") standard defines reserved private IP address spaces in the private realm.

Public client C has a public addressing scheme known to all members of network 10. Each public client has its own public address. Here, public client C has a public IP address $Pu_C$.

Gateway 16 has both a private realm interface 15 and a public realm interface 17. Private realm interface 15 has at least one private address, here private IP address $Pr_G$, and public interface 17 has at least one public address, here public IP address $Pu_G$. In this embodiment, gateway 16 is a computer, which belongs to both the public and the private realms and uses interfaces 15 and 17 to connect private realm 12 with the public realm 14. Other types of interface devices may be used instead of, or in addition to, gateway 16.

Clients A, B and C and gateway 16 also contain a plurality of ports 11. Ports 11 serve as unique endpoint identifiers for logical connections between applications running on clients A, B, C and gateway 16. Port numbers $P_N$ (not shown) serve as addresses within a computer. The port numbers function to identify each individual port 11 located on a particular device in network 10.

Application Y running on a private or public client (for example A) may communicate with another application Z running on another private or public client (for example C) over network 10. Application Y communicates with application Z using a packet 20 sent via ports 11 of clients A and C via gateway 16.

Figure 2:
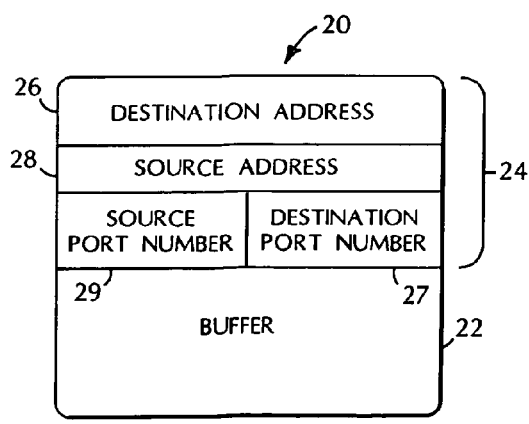
FIG. 2 is a view of a data packet.

Packet 20 (FIG. 2) includes buffer 22 (i.e. the payload or data field containing information sent by application Y to application Z) and address field 24. Address field 24 includes destination IP address 26, source IP address 28, destination port number 27 and source port number 29 for packet 20. Destination address 26 identifies a client who will receive packet 20. Source address 28 identifies a client that will send packet 20. Destination port number 27 identifies the specific port 11 at the destination client that will physically receive packet 20. Source port number 29 identifies the particular port 11 at the source client that will physically send packet 20.

Applications (for example Y and Z) running on private and public clients (for example A and C respectively) build packets 20 using operations named socket calls. Socket calls function to create and use communication entities known as sockets that contain information necessary for applications to prepare, send and receive packets 20.

A socket is a software abstraction that embodies source address 28 and source port number 29 of a client sending a packet and destination address 26 and destination port number 27 of a client receiving the packet. Sockets are used to bind source addresses 28 to source ports 11 identified by source port numbers 29 and destination addresses 26 to destination ports 11 identified by destination port numbers 27.

Examples of socket calls include: SOCKET( ) which creates a communication endpoint; BIND( ) which attaches a local address and port to a socket; LISTEN( ) which announces a willingness to accept a connection; ACCEPT( ) which blocks a caller until a connection attempt arrives; CONNECT( ) which actively attempts to establish a connection; SEND( ) which sends a packet over the connection; RECEIVE( ) which receives a packet over the connection; and CLOSE( ) which releases the connection. Other operations also known as socket calls and not listed above may also be used to perform socket operations depending upon the software/hardware configuration of a particular client A, B or C.

The proper preparation of packet 20 includes providing the proper source address 28, source port number 29, destination address 26, destination port number 27 and buffer 22 in packet 20. The proper source address and port number for packet 20 prepared at a client in the private addressing realm should depend upon the destination of the packet.

Figure 2A:
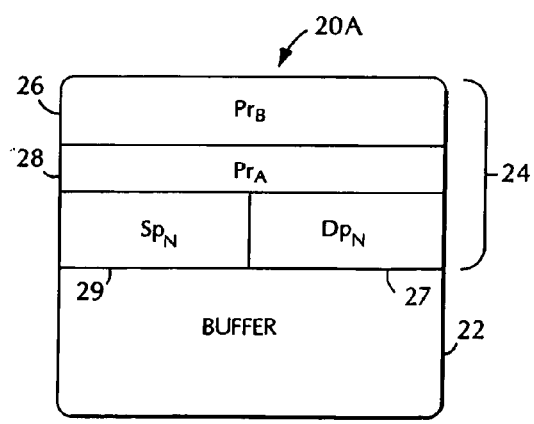
FIG. 2A is a view of a data packet sent from an application on client A to and application on client B after being prepared for the private realm.
Figure 2B:
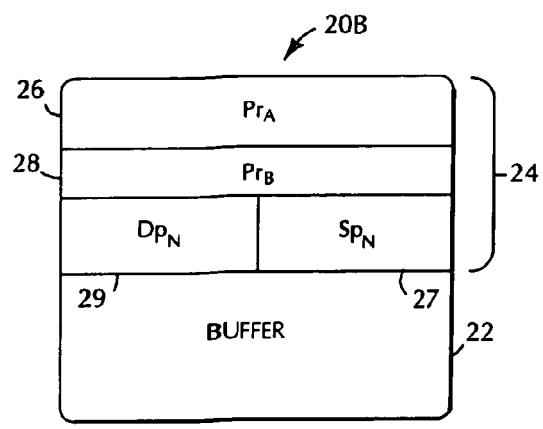
FIG. 2B is a view of a reply data packet to FIG. 2A.

For example, application Y on private client A may send packet 20A (FIG. 2A) to private client B over private realm 12 using private address $Pr_A$ of client A as source address 28, private client A port number $Sp_N$ as source port number 29, private address $Pr_B$ of client B as destination address 26 and private client B port number $Dp_N$ as destination port number 27. Application Z on client B may reply to packet 20A with packet 20B (FIG. 2B) using received source address 28 $Pr_A$ and source port number 29 $Sp_N$ as reply destination address 26 and reply destination port number 27. The addressing information contained in source address 28 and source port number 29 of packet 20A may be considered a private source address for A.

Figure 2C:
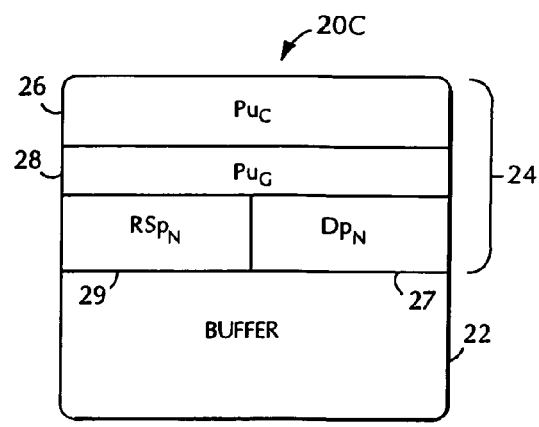
FIG. 2C is a view of a data packet sent from an application on client A to an application on client C after being prepared for the public realm.
Figure 2D:
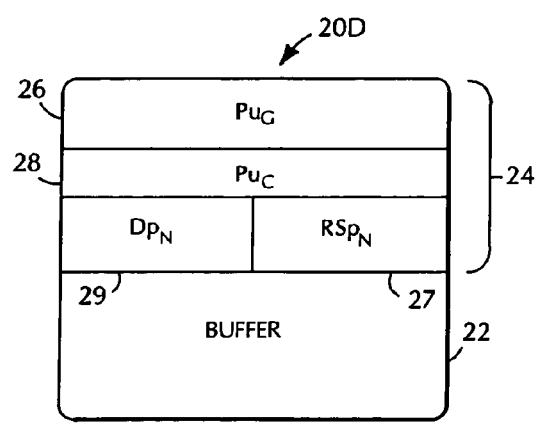
FIG. 2D is a view of a reply data packet to FIG. 2C received at a gateway.

However, for application Y on private client A to send packet 20C (FIG. 2C) to public client C over network 10 application Y must use source address $Pu_G$ of gateway 16 as source address 28, registered source port number $RSp_N$ of client A as source port number 29, public client address $Pu_C$ of client C as destination address 26 and destination port $Dp_N$ of client C as destination port 27. Application Z on client C may then reply to packet 20C with packet 20D (FIG. 2D) using received source address 28, here $Pu_G$ and received source port number 29, here $RSp_N$, as reply destination address 26 and destination port number 27 in packet 20D. The addressing information contained in source address 28 and source port number 29 of packet 20C may be considered a public source address for A.

Hence, a private client, here A, has two source addresses; a private source address (i.e. source address 28 and source port 29 in FIG. 2A) and a public source address (i.e. source address 28 and source port 29 in FIG. 2C); depending on the destination of packet 20. The multiple addresses are needed to ensure packets 20D are routed correctly in the public and private realms. Packets 20D received in response to packets 20C sent over the public realm 14 are de-multiplexed, using registered source port $RSp_N$, to reach their intended recipient of private realm 12. Heretofore, address fields 24 of packets 20C were translated between private and public source addresses after they were created.

Network Address Translation ("NAT") is a protocol that enables Internet Protocol ("IP") computers in a private realm to exchange data packets with IP computers in the public realm via a gateway. NAT functions by modifying (i.e. translating) the source address information of packets received at the gateway to ensure packets contain the proper source address.

Host-NAT is a protocol that enables computers in the private realm to perform NAT on packets prior to sending packets to a gateway. In other words, Host-NAT allows private clients, as opposed to the gateway, to modify packets between the private and public addressing realms.

Network Address Translation ("NAT") translates the address field of packet 20C between public and private realms. NAT enables packet 20C to be routed between the public and private addressing realms by modifying (i.e. translating) the source IP address 28 and/or port addresses 27 and 29 of packet 20C between the public and private addressing realms.

Realm Specific Internet Protocol ("RSIP") is a protocol that enables clients (e.g. A and B) in the private addressing realm to perform Host-NAT. Host-NAT allows a private client of private realm 12 to perform NAT functions to prepare packets to be sent over network 10.

Heretofore, applications employing NAT, Host-NAT and RSIP failed for applications requiring the proper addressing and port information prior to building packet 20C. For example, applications that encrypt packet 20C or insert addressing information 24 into buffer 22, like IP telephony, require the proper address and port information prior to building a packet. Often, recipients of packets sent by these applications receive addressing information in buffer 22. NAT, Host-NAT and RSIP fail such applications because NAT, Host-NAT and RSIP only manipulate information within address field 24 and do not update addressing information that may be provided within buffer 22.

Figure 3:
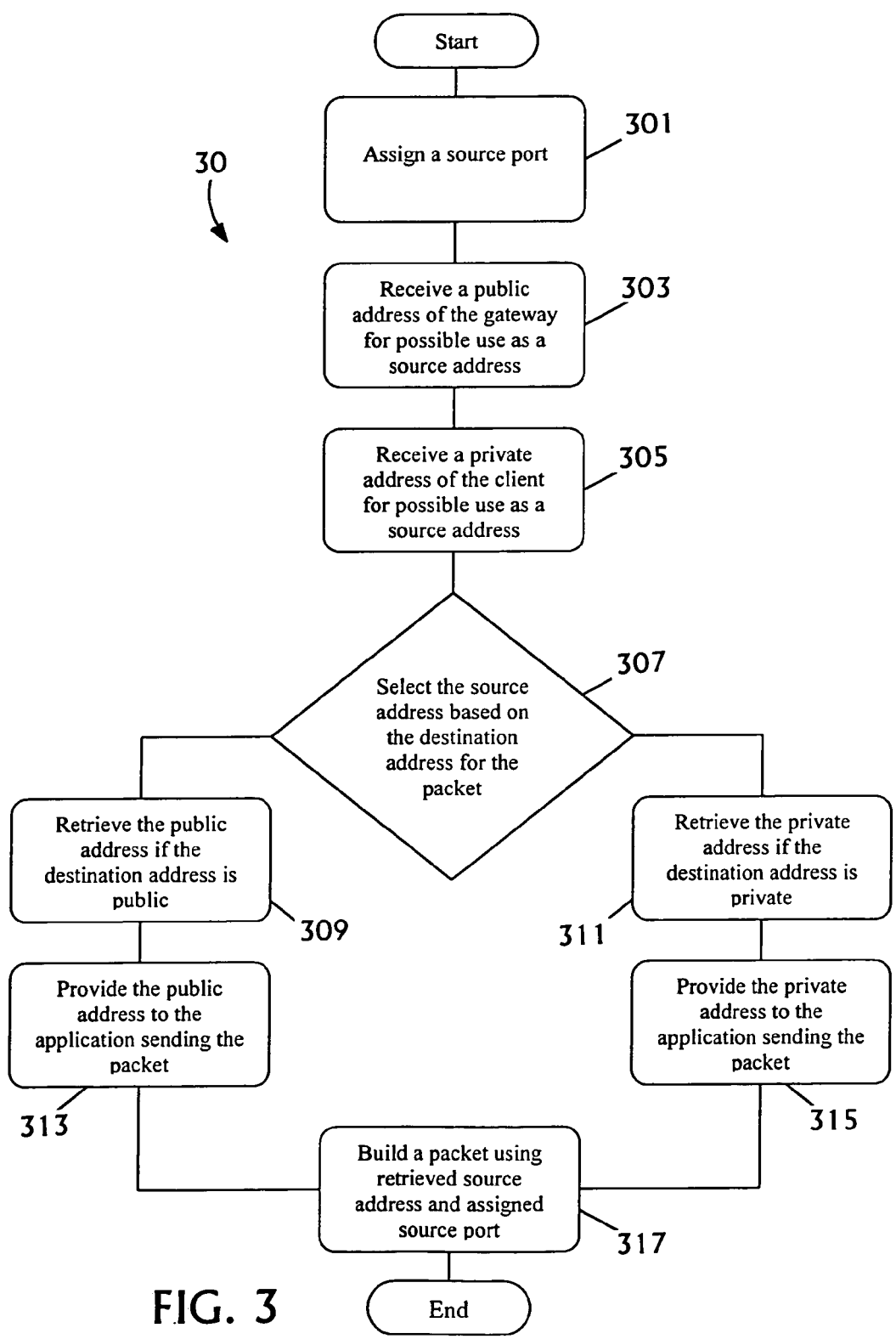
FIG. 3. is a flow diagram for providing information for preparing data packets.

FIG. 3 shows process 30, which provides necessary addressing information to an application on a client (for example client A) prior to preparing packet 20. In other words, packets prepared by process 30 do not need to be translated after they are made. Process 30 assigns (301) a source port 11 for a packet 20 by providing source port number 29 of port 11 to private client A. Source port number 29 is registered with gateway 16 for use in de-multiplexing the addressing information (i.e. address field 24) of reply packets to client A if packet 20 is sent to the public addressing realm. Source port number 29 may also be selected from a pool of source ports previously registered with gateway 16 to increase the efficiency of assigning ports 11 in process 30.

Client A receives (303) a public address of gateway 16, for example $Pu_G$, for use with the assigned (301) source port number 29 of client A. Here, client A receives (303) the public address of gateway 16 for possible use as the public address of A.

Client A receives (305) a private address of client A, here $Pr_A$, for use with the assigned (301) source port number 29 of client A. Here, client A receives (305) the private address $Pr_A$ for possible use as the private address of A.

Client A selects (307) either the public or private address of A to use as its source address 28 based on the destination address 26 of packet 20. If the destination address 26 of packet 20 is public, process 30 retrieves (309) the public address of the gateway for use as the source address 28. If the destination address 26 of packet 20 is private, process 30 retrieves (311) the private address of the client for use as source address 28.

Process 30 provides (313) the retrieved (309) public address to the application (for example Y) on client A if Y is attempting to send a packet 20 to an address in the public realm. Process 30 provides (315) the retrieved (311) private address to application Y on client A if Y is attempting to send a packet 20 to an address in the private realm.

The retrieved public (309) and private (311) addresses are provided (313 and 315) to client A for use by application Y. The assigned (301) source port is also provided to application Y. For example application Y may encrypt the addressing information 24 of packet 20. Application Y may also insert the proper addressing information 24 within buffer 22.

Process 30 enables client A to build (317) packet 20 using the retrieved public (309) or private (311) source address 28 and the assigned (301) source port number 29. Packet 20 will be built to contain the proper addressing information, based on its destination address 26, without the need to translate or modify addressing information 24.

Figure 4:
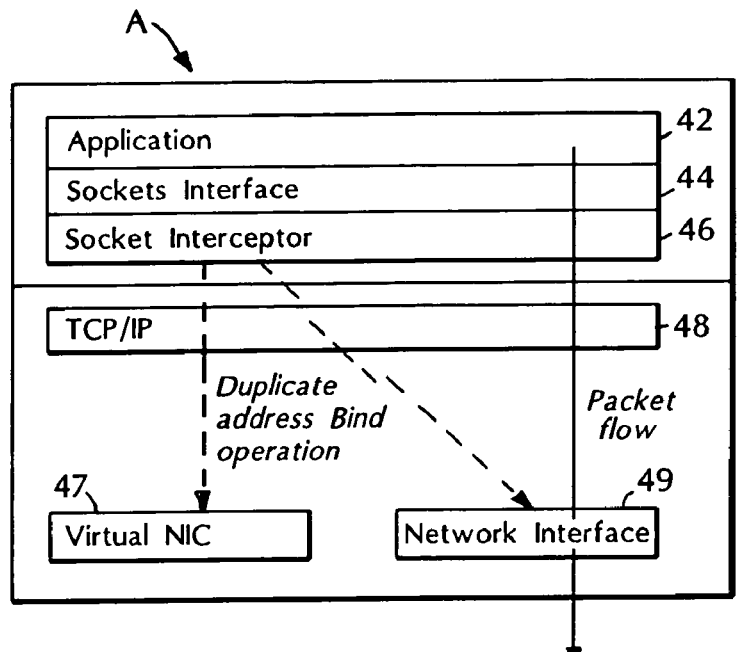
FIG. 4. is a view of software architecture to implement process 30.

FIG. 4 shows an illustration of architecture on a private client, here A, able to implement process 30. Client A includes application 42, socket interface 44, socket interceptor 46, transmission control protocol/internet protocol layer 48, virtual network interface card 47 and network interface card 49. Virtual network interface card 47 is a software module that provides a public address of gateway 16 to socket interceptor 46 and socket interface 44.

For example, application 42 initiates the creation of a packet 20 by sending a signal to socket interface 44. Socket interface 44 receives a signal from application 42 to initiate socket bind operations for creating a socket for building (317) packet 20. Socket interceptor 46 intercepts the socket bind operations to ensure a proper source port 11 of client A is assigned (301) to the socket created for packet 20. Typically, this involves assigning a source port number 29 for the socket from a pool of source ports registered with A.

For an application requiring binding to a specific source port 11 socket interceptor 46 will close the first socket opened for packet 20 (if it is not the desired source port) and attempt to open a new socket for packet 20. The new socket will attempt to bind to the specific source port required by the application. Opening the new specific socket for packet 20 will succeed provided another application or private client of gateway 16 is not using the specific source port. If the new socket fails, the request to send a packet will be dropped and the application will have to try again.

Assigned source port number 29 may be stored in a memory table (not shown) accessible to gateway 16. The assigned source port number 29 may be used by gateway 16 to de-multiplex destination addresses $Pu_G$ of a packet received in response to a packet sent by a private client. For example, gateway 16 may de-multiplex a packet 20D using assigned source port number 29 mapped in a mapping table to private source address $Pr_A$ that the port number is assigned too. The destination port number 27 of reply packet 20D, here the source port number 29, is mapped to the address PrA of the client that sent packet 20C. Thus, the reply packet received at the interface device, here gateway 16, is de-multiplexed and sent to the client who has been assigned the source port number 29 found in the destination port number 27 of the reply packet received at interface 17.

Socket interceptor 46 also creates two sockets for each socket which application 42 requests for building a packet. One of the sockets is a public socket and is be bound to the public address of the client (i.e. the public gateway address, here $Pu_G$). The other socket is a private socket and is bound to the private address of client A, here $Pr_A$.

The selection (307) of the public or private socket from which packet 20 is built is based on the destination address of the packet found in a socket call (for example connect( ) or sendto( )). Once the public or private socket is selected (307) packet 20 is built (317) and flows through the regular network interface card 49 according to the specifications in the route table of the client.

Figure 5:
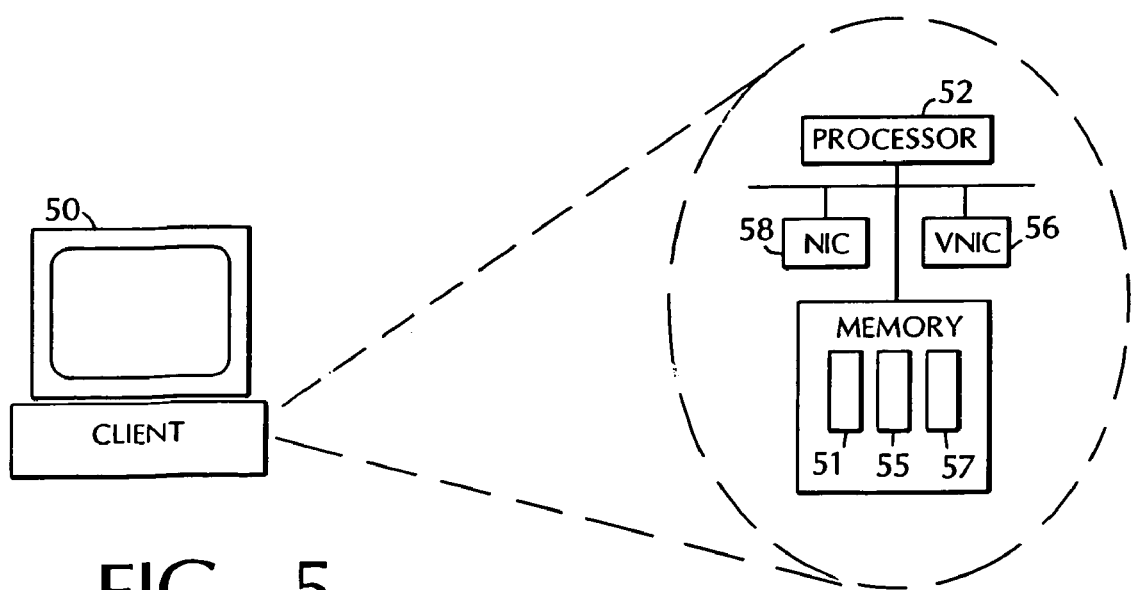
FIG. 5 is a view of computer hardware for implementing process 30.

FIG. 5 shows a computer 50 serving as a private client A for preparing packets 20 according to process 30. Computer 50 includes a processor 52, a memory 54 including executable instructions 51, a protocol stack 55, a mapping table 57 accessible to gateway 16, a driver 56 serving as virtual interface card and a network interface card 58. Processor 52 executes computer instructions of RAM (not shown) to implement process 30.

Process 30, however, is not limited to use with any particular hardware or software configuration and may find applicability in any computing or processing environment. Process 30 may be implemented in hardware, software, or a combination of the two. Process 30 may be implemented in computer programs executing on programmable computers that each include a processor, a storage medium readable by the processor including volatile and non-volatile memory and/or storage elements and input and output devices.

Process 30 may be implemented in a high level procedural or object-oriented programming language as one or more programs to communicate with a computer system. However, the programs can be implemented in assembly or machine language. The language may be compiled or interpreted language.

Each computer program may be stored on a storage medium or device (e.g. CD-Rom, hard disk, or magnetic diskettes) that is readable by a general or special purpose programmable computer for configuring and operating the computer to perform process 30. Process 30 may also be implemented as a computer-readable storage medium, configured with a computer program, where, upon execution, instruction in the computer program cause the computer to operate in accordance with process 30.

A number of embodiments of the invention have been described. Nevertheless, it will be understood that various modifications may be made without departing from the spirit and scope of the invention. For example, clients A, B, C and gateway 16 may have multiple public and private addresses for sending packets. Accordingly, other embodiments are within the scope of the following claims.

What is claimed is:

1. In a network having public and private realms separated by an interface device, a method performed by a client on the private realm for use in sending a data packet through the network, the method comprising:
determining, before an application running on the client finishes building the data packet to be sent, if a destination address of the data packet corresponds to the private realm or to the public realm;
retrieving, before the application running on the client finishes building the data packet to be sent, a public address of the interface device that is addressable from the public realm if the destination address corresponds to the public realm;
retrieving, before the application running on the client finishes building the data packet to be sent, a private address of the client that is addressable from the private realm if the destination address corresponds to the private realm;
assigning, before the application running on the client finishes building the data packet to be sent, a retrieved address to be the source address of the data packet; and
the method further comprising;
installing a software module on the client; and
binding the software module to the public address of the interface device;
wherein the public address of the interface device is retrieved via the software module.

2. The method of claim 1, further comprising:
registering the client with a port on the interface device; and
binding a software interface of the application running on the client to the port on the interface device.

3. The method of claim 2, further comprising sending the data packet from the application, through the software interface, to the port on the interface device.

4. The method of claim 2, wherein binding comprises:
intercepting a bind operation performed by the application running on the client; and
directing the bind operation to bind the software interface to the port on the interface device.

5. The method of claim 1, further comprising:
binding a first software interface to the public address of the interface device for use in transmitting the data packet to the public realm; and
binding a second software interface to the private address of the client for use in transmitting the data packet to the private realm.

6. The method of claim 1, wherein the private address of the client is retrieved from a network interface card on the client.

7. An article comprising:
a machine-readable medium for storing instructions that are executable by a client on a private realm of a network having public and private realms separated by an interface device, the instructions causing the client to;
determine, before an application running on the client finishes building a data packet to be sent, if a destination address of the data packet corresponds to the private realm or to the public realm;
retrieve, before the application running on the client finishes building the data packet to be sent, a public address of the interface device that is addressable from the public realm if the destination address corresponds to the public realm;
retrieve, before the application running on the client finishes building the data packet to be sent, a private address of the client that is addressable from the private realm if the destination address corresponds to the private realm;
assign, before the application running on the client finishes building the data packet to be sent, a retrieved address to be the source address of the data packet; and
the instructions further causing the client to;
install a software module on the client; and
bind the software module to the public address of the interface device;
wherein the public address of the interface device is retrieved via the software module.

8. The article of claim 7, the instructions further causing the client to:
register the client with a port on the interface device; and
bind a software interface of the application running on the client to the port on the interface device.

9. The article of claim 8, the instructions further causing the client to sending the data packet from the application, through the software interface, to the port on the interface device.

10. The article of claim 8, wherein bind further comprises causing the client to:
intercept a bind operation performed by the application running on the client; and
direct the bind operation to bind the software interface to the port on the interface device.

11. The article of claim 7, the instructions further causing the client to:
bind a first software interface to the public address of the interface device for use in transmitting the data packet to the public realm; and
bind a second software interface to the private address of the client for use in transmitting the data packet to the private realm.

12. The article of claim 7, the instructions further causing the client to retrieve the private address of the client from a network interface card on the client.

13. In a network having public and private realms separated by an interface device, a client in the private realm comprising a memory which stores computer-executable instructions for use in sending a data packet through the network; and a processor which executes the instructions to:
determine, before an application running on the client finishes building the data packet to be sent, if a destination address of the data packet corresponds to the private realm or to the public realm;
retrieve, before the application running on the client finishes building the data packet to be sent, a public address of the interface device that is addressable from the public realm if the destination address corresponds to the public realm;
retrieve, before the application running on the client finishes building the data packet to be sent, a private address of the client that is addressable from the private realm if the destination address corresponds to the private realm; and
assign, before the application running on the client finishes building the data packet to be sent, a retrieved address to be the source address of the data packet; and
further comprising instructions to;
install a software module on the client; and
bind the software module to the public address of the interface device;
wherein the public address of the interface device is retrieved via the software module.

14. The apparatus of claim 13, further comprising instructions to:
register the client with a port on the interface device; and
bind a software interface of the application running on the client to the port on the interface device.

15. The apparatus of claim 14, further comprising instructions to send the data packet from the application, through the software interface, to the port on the interface device.

16. The apparatus of claim 14, wherein bind further comprising instructions to:
intercept a bind operation performed by the application running on the client; and
direct the bind operation to bind the software interface to the port on the interface device.

17. The apparatus of claim 13, further comprising instructions to:
bind a first software interface to the public address of the interface device for use in transmitting the data packet to the public realm; and
bind a second software interface to the private address of the client for use in transmitting the data packet to the private realm.

18. The apparatus of claim 13, further comprising:
a network interface card have that private address of the client.

19. A network comprising;
an interface device that controls data packet traffic between public and private address realms of the network; and
an internal client on the private address realm;
wherein the client;
determines, before an application running on the client finishes building a data packet to be sent, if a destination address of the data packet corresponds to the private realm or to the public realm;
retrieves, before the application running on the client finishes building the data packet to be sent, a public address of the interface device that is addressable from the public realm if the destination address corresponds to the public realm;
retrieves, before the application running on the client finishes building the data packet to be sent, a private address of the internal client that is addressable from the private realm if the destination address corresponds to the private realm;

assigns, before the application running on the client finishes building the data packet to be sent, a retrieved address to be the source address of the data packet; and the client comprises a software module installed on the client and bound to the public address of the interface device, wherein the public address of the interface device is retrieved via the software module.

20. The network of claim 19, wherein the interface device:

receives the data packet from the internal client; and routes the data packet in accordance with the destination address of the data packet.

21. The network of claim 19, further comprising an external client on the public realm of the network, the external client sending a second data packet to the internal client at the source address;

wherein the interface device;

receives the second data packet from the external client;

compares the source address to a mapping table of ports that correspond to clients on the private realm; and routes the second data packet to the internal client on the private realm using the mapping table.

* * * * *